US012773834B2

(12) United States Patent
Rouby et al.

(10) Patent No.: US 12,773,834 B2

(45) Date of Patent: Oct. 27, 2026

(54) COEXTRUSION INSTALLATION FOR PRODUCING A TREAD HAVING REINFORCING INSERTS EMBEDDED AT DEPTH IN THE TREAD PATTERN BLOCKS

(71) Applicant: Compagnie Generale Des Etablissements Michelin, Clermont-Ferrand (FR)

(72) Inventors: Mickael Rouby, Clermont-Ferrand (FR); Dominique Denis, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 501 days.

(21) Appl. No.: 18/038,635

(22) PCT Filed: Sep. 7, 2021

(86) PCT No.: PCT/FR2021/051527

§ 371 (c)(1),
(2) Date: May 24, 2023

(87) PCT Pub. No.: WO2022/112666

PCT Pub. Date: Jun. 2, 2022

(65) Prior Publication Data

US 2024/0034015 A1 Feb. 1, 2024

(30) Foreign Application Priority Data

Nov. 27, 2020 (FR) ...................................... 2012249

(51) Int. Cl.

*B29D 30/52* (2006.01)
*B60C 11/24* (2006.01)

(52) U.S. Cl.

CPC .............. *B29D 30/52* (2013.01); *B60C 11/24* (2013.01)

(58) Field of Classification Search

CPC .............. B29D 30/52; B29D 2030/061; B29D 2030/68; B60C 11/0041; B60C 11/005; B60C 11/24

(Continued)

(56) References Cited

U.S. PATENT DOCUMENTS

2013/0174952 A1 7/2013 Abad et al.
2020/0114565 A1 4/2020 Rouby et al.
2021/0197438 A1 * 7/2021 Bessac .................... B29C 48/08

FOREIGN PATENT DOCUMENTS

FR 3046104 A1 * 6/2017 ............ B29C 48/41
WO 2012028429 A1 3/2012

(Continued)

*Primary Examiner* — Sedef E Paquette

(74) *Attorney, Agent, or Firm* — Dickinson Wright PLLC

(57) ABSTRACT

The coextrusion installation is intended to generate a profiled element for a tire tread by extruding a sublayer made of first elastomeric compound, an overlayer made of second elastomeric compound for forming the tread pattern blocks, and inserts made of third elastomeric compound. The installation includes pre-scrapers followed by scrapers for deepening the embedding trenches, injectors for injecting an insert at the bottom of each embedding trench, and then a covering wall which allows the streams of the second elastomeric compound to meet by filling the embedding trench in question and by covering the corresponding insert so as to embed the insert at a predetermined embedding depth.

8 Claims, 6 Drawing Sheets

(58) Field of Classification Search
USPC .......................................................... 156/114
See application file for complete search history.

(56) References Cited

FOREIGN PATENT DOCUMENTS

| | | | |
|---|---|---|---|
| WO | 2017146734 | A1 | 8/2017 |
| WO | 2019002782 | A1 | 1/2019 |

* cited by examiner

G-G

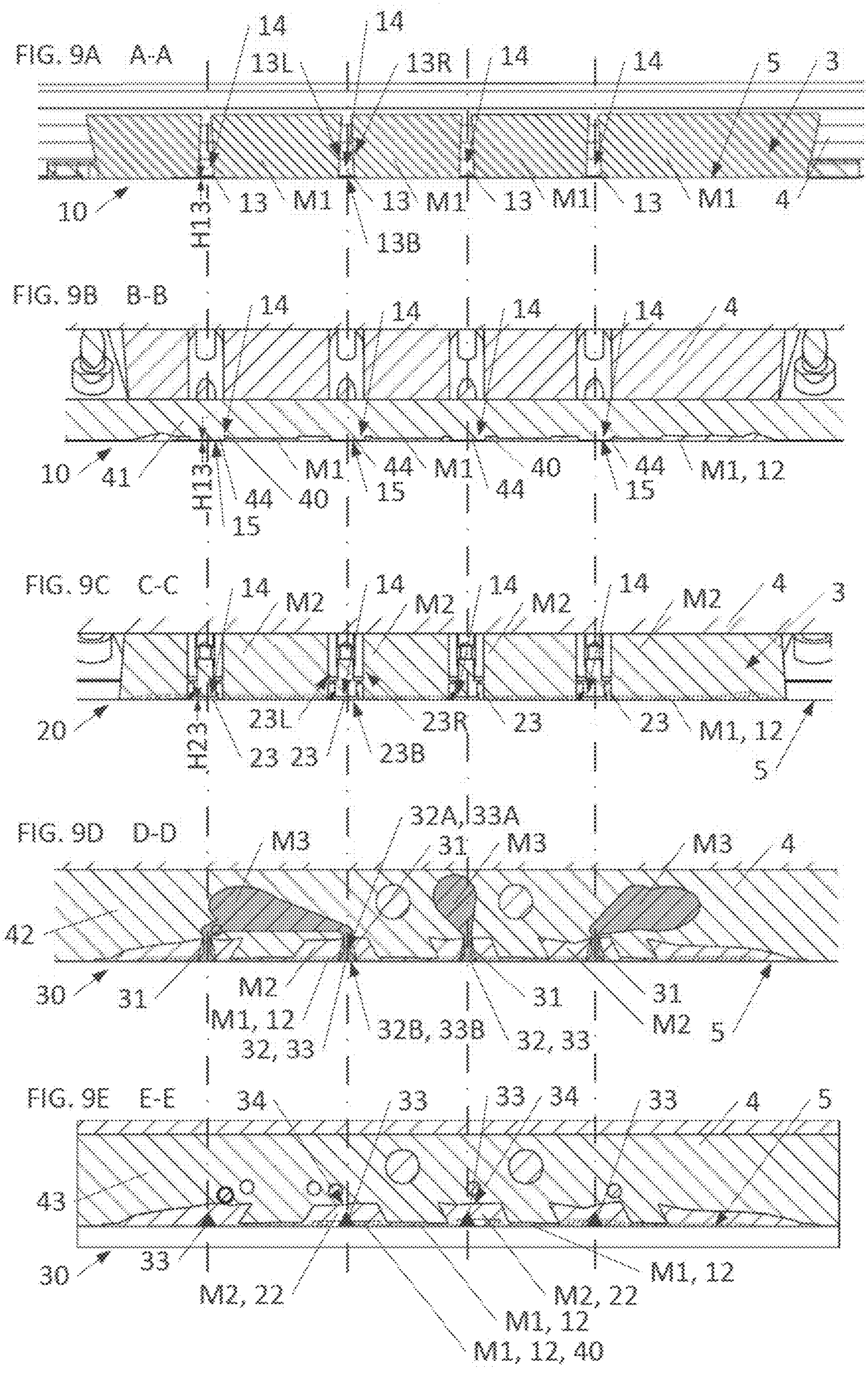
FIG. 9A A-A
14
13L
14
13R
14
14
5
3
10
H13
13
M1
13
M1
13
M1
13
M1
4
13B
FIG. 9B B-B
14
14
14
14
4
10
41
H13
44
40
M1
44
M1
44
40
44
M1, 12
15
15
15
FIG. 9C C-C
14
M2
14
M2
14
M2
14
M2
4
3
20
H23
23L
23R
23
23
M1, 12
23 23
23B
5
FIG. 9D D-D
32A, 33A
M3
31
M3
M3
4
42
30
31
M2
M1, 12
32, 33
32B, 33B
32, 33
31
31
M2
5
FIG. 9E E-E
34
33
33
34
33
4
5
43
30
33
M2, 22
M1, 12
M2, 22
M1, 12
M1, 12, 40

COEXTRUSION INSTALLATION FOR PRODUCING A TREAD HAVING REINFORCING INSERTS EMBEDDED AT DEPTH IN THE TREAD PATTERN BLOCKS

CROSS-REFERENCE TO RELATED APPLICATION

This application claims priority to and the benefit of PCT Patent Application No. PCT/FR2021/051527 filed on 7 Sep. 2021, entitled "COEXTRUSION INSTALLATION FOR PRODUCING A TREAD HAVING REINFORCING INSERTS EMBEDDED AT DEPTH IN THE TREAD PATTERN BLOCKS", and French Patent Application No. FR2012249, filed on 27 Nov. 2020, entitled "COEXTRUSION INSTALLATION FOR PRODUCING A TREAD HAVING REINFORCING INSERTS EMBEDDED AT DEPTH IN THE TREAD PATTERN BLOCKS".

BACKGROUND

1. Field

The present invention relates to the general field of coextrusion installations for producing profiles, notably profiled elements based on elastomeric compounds, which may, for example, be intended for the manufacture of pneumatic tires, and in particular be intended for forming the tread of such tires.

2. Related Art

In order for pneumatic tires to meet the necessary requirements in relation to roadholding and low rolling resistance, it is known to produce treads which combine multiple functional elements, specifically first of all a radially internal sublayer which is made from a first elastomeric compound and which is intended to be applied to the crown reinforcement of the tire, a radially external layer which is formed by a second elastomeric compound which is distinct from the first and is intended to form the tread pattern blocks of the tread that will come into contact with the roadway when the tire is in use on a vehicle, and lastly circumferential reinforcers, generally of triangular cross section, which are formed from an elastomeric compound exhibiting a stiffer behaviour than the second compound making up the tread pattern blocks, such that the circumferential reinforcers can laterally support the tread pattern blocks with respect to deformations when cornering, that is to say with respect to lateral shear deformations in a plane containing the central axis of rotation of the tire.

To produce such profiled elements, the applicant has developed suitable coextrusion tools, as described notably in the applications WO-2019/002782 or WO-2019/081362, in which provision is made of a channel of triangular cross section which makes it possible to form the circumferential reinforcer in one piece with the sublayer and to delay the bringing together of the second elastomeric compound, forming the tread pattern blocks, with the reinforcer, in order to not destabilize or deform the reinforcer during the extrusion. In the first of these applications, namely WO-2019/002782, the tool makes it possible to form a sublayer which extends continuously over a considerable width of the profiled element, in order to be shared by multiple neighbouring tread pattern blocks, whereas, in the second application, WO-2019/081362, the width of the sublayer is interrupted at each tread pattern block, by means of scrapers which keep spaces free in the sublayer in order to form multiple distinct sublayer portions, before the compound making up the tread pattern blocks is introduced into the free spaces, and lastly bears against the reinforcers that form the limits of the sublayer portions laterally bordering each tread pattern block in question.

However, there is nevertheless a desire to produce increasingly complex treads, such as those illustrated in the international application WO-2018/002487 filed by the applicant, within which, for the one part, the circumferential reinforcer must be able to be made from a third elastomeric compound which is distinct both from the first elastomeric compound making up the sublayer and from the second elastomeric compound making up the tread pattern blocks, and within which, for the other part, a decision on the shapes, the insertion positions and the respective dimensions of the reinforcers, of the sublayer and of the tread pattern blocks must be able to be done very freely, both in the lateral direction corresponding to the width of the profiled element and in the vertical direction corresponding to the thickness of the profiled element.

SUMMARY

The objectives assigned to the present disclosure therefore aim to remedy the aforementioned drawbacks and to propose a new coextrusion installation which, whilst still being very reliable and exhibiting relatively simple operation, makes it possible to produce such a profiled element of increased complexity.

The objectives assigned to the present disclosure are achieved by means of a coextrusion installation intended for generating a profiled element by conjointly extruding a plurality of elastomeric compounds along a shared flow direction which corresponds to the longitudinal direction of the profiled element. The installation comprises an extrusion head which feeds the elastomeric compounds, and a receiving surface, such as a roller, which is positioned facing the extrusion head in order to define a gap serving to shape the cross section of the profiled element, in terms of thickness along a direction referred to as "vertical direction", which is perpendicular to the longitudinal direction and to the receiving surface, and in terms of width along a direction referred to as "lateral direction", which is perpendicular to the longitudinal direction and to the vertical direction. The extrusion head comprises, from upstream to downstream along the flow direction: a first head portion, a second head portion, and a third head portion. The first head portion is provided with one or more first intake channels leading into the gap in order to bring a first elastomeric compound, intended to form a sublayer of the profiled element, into contact with the receiving surface. The first head portion also comprises at least one pre-scraper which projects vertically into the gap with delimitation, along the lateral direction, by a first lateral face and a second lateral face, and, along the vertical direction, by a lower face which faces towards the receiving surface with positioning at a first predetermined, non-zero distance from the receiving surface, referred to as "pre-scraping thickness." Thus, the pre-scraper can reserve, within the stream of the first elastomeric compound, a trench referred to as "embedding trench" which is bordered for the one part laterally by a first lateral substream of the first elastomeric compound and by a second lateral substream of the first elastomeric compound, which first and second lateral substreams flow on either side of the pre-scraper, along the first lateral face and along the second lateral face of the pre-scraper, respectively, and for the other part vertically by a bottom substream which flows between the receiving surface and the lower face of the pre-scraper, in the pre-scraping thickness, to form a residual layer of first elastomeric compound. The second head portion is provided with one or more second intake channels which lead into the gap in order to feed a second elastomeric compound intended to cover the sublayer of first elastomeric compound coming from the first head portion. The second head portion comprises at least one scraper which extends in the longitudinal continuation of the pre-scraper, and which projects vertically into the gap so as to have a first lateral face, a second lateral face, and a lower face which faces towards the receiving surface, at a second vertical distance from the receiving surface referred to as "scraping thickness" which is strictly less than the pre-scraping thickness. For the one part, the scraper can laterally preserve the embedding trench by making the stream of the second elastomeric compound form a first lateral substream of second elastomeric compound and a second lateral substream of second elastomeric compound, which flow along the first lateral face and along the second lateral face, respectively, of the scraper and which form an added thickness of the first and the second substream of first elastomeric compound, respectively, which come from the first head portion. For the other part, the scraper makes it possible to vertically deepen the embedding trench with a reduction, in accordance with the scraping thickness, in the thickness of the residual layer of first elastomeric compound at the bottom of the embedding trench. The third head portion comprises at least one injector which projects into the gap, in the longitudinal continuation of the scraper. The injector has an injection opening intended to inject a third elastomeric compound, distinct from the second elastomeric compound, so as to form an insert in the embedding trench. The third head portion moreover comprises, following the injector in the longitudinal direction, a covering wall which extends over a predetermined length referred to as "confluence length" along the longitudinal direction, from the injection opening to the outlet of the gap. The flow of the profiled element below the covering wall allows the first and second lateral substreams of second elastomeric compound to close up over the insert, thus filling the embedding trench.

Advantageously, the extrusion head according to the invention therefore has a true embedding device, which makes it possible to open a trench in the first elastomeric compound making up the sublayer, by means of the pre-scrapers, to conserve this trench by virtue of the scrapers when the second elastomeric compound arrives, which second elastomeric compound is preferably intended to make up the tread pattern blocks, then to deposit the third elastomeric compound making up the insert, in this instance preferably intended to form a circumferential reinforcer, in the trench, before lastly allowing the second elastomeric compound to fill the trench in order to coat the insert.

Such an embedding device advantageously makes it possible to disassociate the management of the (at least) three different elastomeric compounds which make up the various functional members of the profiled elements—in this instance preferably: the sublayer, the tread pattern blocks, and the circumferential reinforcers, this offering great freedom in terms of the choice of the respective compositions of the elastomeric compounds, and in terms of the insertion of the various corresponding functional members, both along the lateral direction and along the vertical direction.

Thus, in particular, the installation according to the invention makes it possible, notably by way of a suitable configuration of the third head portion and the injector, to embed the insert inside a block of the second elastomeric compound both along the lateral direction, this making it possible, for example, to position the insert substantially in the middle of the block of second elastomeric compound, and along the vertical direction, this allowing, for example, the second compound to cover the insert, in order that the insert is not exposed on the visible face of the profiled element.

Applied to the manufacture of a pneumatic tire tread, the fact of thus embedding the circumferential reinforcer insert made of third elastomeric compound within the tread pattern block made of second elastomeric compound, such that the radially outermost apex of the insert is radially recessed in the radially external visible face of the tread pattern block, below a predetermined thickness of the second elastomeric compound, advantageously makes it possible to disassociate the load-bearing function, which is provided by the tread pattern block that works in elastic radial compression in contact with the roadway without the insert coming into contact with the roadway or, therefore, interfering with this load-bearing function, from the function of resistance to cornering, which is provided by the insert which limits the axial shear of the tread pattern block.

In addition, the use of a row of a pre-scraper and then a scraper makes it possible to gradually shape the first elastomeric compound making up the sublayer, this promoting steady and durable operation of the installation. This is because, first of all, the presence of the pre-scraper in the first head portion makes it possible to limit the residual thickness of first elastomeric compound which is then to be deepened further, or even completely removed, by the scraper in the second head portion, this avoiding the first elastomeric compound clogging (or "jamming") at the scraper. Moreover, the fact of nevertheless conserving a spacing of non-zero thickness between the pre-scraper and the receiving surface by maintaining a separating distance between the pre-scraper and the receiving surface, avoids the creation, in the first head portion, of premature contact and therefore premature friction between the extrusion head and the receiving surface, that is to say contact which would occur upstream of the scraper, this therefore making it possible, when the receiving surface is driven in displacement in relation to the extrusion head along the longitudinal direction in order to accompany the movement of the profiled element, to limit the wear of the pre-scrapers and the receiving surface, the amount of energy required to drive the receiving surface, and the risks of untimely blocking of the receiving surface.

Advantageously, within a tread for a pneumatic tire, the fact of minimizing the thickness of the sublayer made of first elastomeric compound, or even of eliminating the sublayer, at the locations intended for the circumferential reinforcer inserts made of third elastomeric compound, makes it possible for the reinforcing inserts to rest in direct contact with the underlying reinforcement of the crown of the tire, and consequently to avoid hysteresis-related energy dissipation phenomena in the sublayer, thereby contributing to limiting the heating of the tire and reducing the rolling resistance of the tire, and consequently to reducing the fuel consumption of the vehicle.

BRIEF DESCRIPTION OF THE DRAWINGS

Further subjects, features and advantages of the invention will become apparent in more detail from reading the following description and with the aid of the appended drawings, which are provided purely by way of nonlimiting illustration, in which:

FIG. 9A illustrates, in a view in section normal to the longitudinal flow direction, the intake of the first elastomeric compound intended to form the sublayer into the first portion of the extrusion head of FIGS. 6 and 7, and the division of the first elastomeric compound between multiple pre-scrapers.

FIG. 9B illustrates, in a view in section normal to the longitudinal flow direction, at the downstream end of the first head portion, the division and the shaping of the sublayer such that the division and the shaping result from the action of the first head portion and its pre-scrapers.

FIG. 9C illustrates, in a view in section normal to the longitudinal flow direction, in the second head portion, the action of the scrapers each of which defines an embedding trench and divides the first compound forming the sublayer and the second compound intended to form the tread pattern blocks into lateral substreams which laterally border the embedding trench in question.

FIG. 9D illustrates, in a view in section normal to the longitudinal flow direction, the injectors of the third head portion that are located in the continuity of the scrapers and which introduce the third elastomeric compound intended to form the inserts into each embedding trench in question, and which shape the third elastomeric compound depending on the desired cross section for the insert, in this instance a triangular cross section.

FIG. 9E illustrates, in a view in section normal to the longitudinal flow direction, in a part of the third head portion located downstream of the injectors, the reconstitution of a layer of second elastomeric compound between the apex of each insert in question and the covering wall which is vertically in line with the insert, the layer of second elastomeric compound resulting from the confluence of the first and second lateral streams of second elastomeric compound which meet at the trailing edge of each injector in question and fuse with one another on top of the insert.

DESCRIPTION OF EMBODIMENTS

Figure 1:
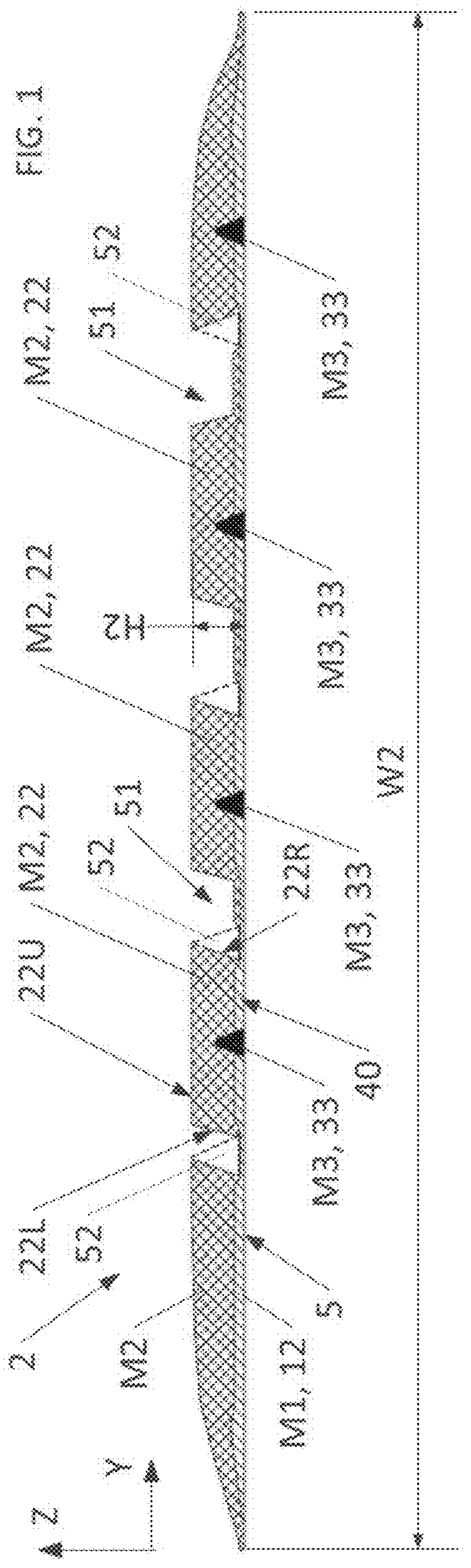
FIG. 1 illustrates, in a view in cross section normal to the longitudinal direction of the profiled element, an exemplary profiled element obtained by a coextrusion installation according to the invention, the profiled element being intended to form a tread.

The present disclosure relates to a coextrusion installation 1.

The installation 1 is intended to create a profiled element 2 by conjointly extruding a plurality of elastomeric compounds M1, M2, M3 along a shared flow direction which corresponds to the longitudinal direction X of the profiled element 2.

To that end, the installation 1 comprises an extrusion head 4 which feeds the elastomeric compounds M1, M2, M3, and a receiving surface 5, such as a roller 6, which is positioned facing the extrusion head 4 in order to define a gap 3 serving to shape the cross section of the profiled element 2, in terms of thickness H2 along a direction referred to as "vertical direction" Z, which is perpendicular to the longitudinal direction X and to the receiving surface 5, and in terms of width W2 along a direction referred to as "lateral direction" Y, which is perpendicular to the longitudinal direction X and to the vertical direction Z.

An exemplary cross section for such a profiled element 2 intended to form a tread for a tire of a wheel, for example for a pneumatic tire, or else for a non-pneumatic tire within which the tread is supported by a mechanical element of the solid hub or spoke network type, is illustrated in FIG. 1.

The receiving surface 5 is advantageously mounted so as to be able to move in relation to the extrusion head 4, so as to be able to be driven in displacement along the longitudinal direction X, and thus accompany the longitudinal progression of the profiled element 2, or even tow the profiled element 2, as the profiled element 2 is created by coextrusion.

In this regard, in a possible implementation variant, the receiving surface 5 could be formed by a conveyor belt driven in translational movement along the longitudinal direction X in relation to the extrusion head 4. In this variant, the receiving surface 5 could form a flat surface.

Figure 2:
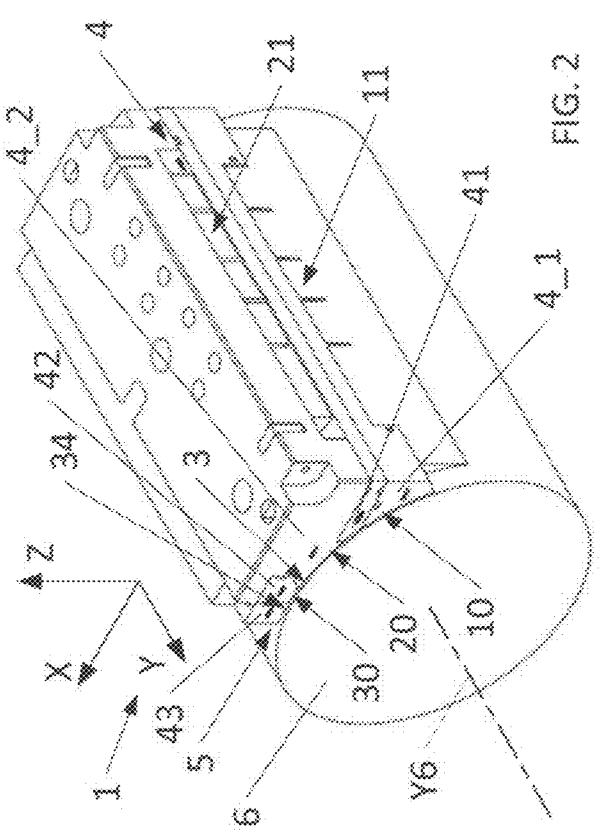
FIG. 2 illustrates a perspective view from above of a coextrusion installation for manufacturing the profiled element of FIG. 1.

As an alternative, in another more preferable implementation variant, the receiving surface 5 will be formed by a roller 6, and more particularly by the radially external surface, exhibiting symmetry of revolution, of the roller 6, the roller 6 being driven in rotation in relation to the extrusion head 4, about the central axis Y6 of the roller which is parallel to the lateral direction Y, and therefore perpendicular to the longitudinal axis X, as illustrated in FIG. 2. The roller 6 will preferably form a straight cylinder, with a circular base.

For the convenience of the description, with reference to such a roller 6 and/or with reference to the arrangement of the finished tire within which the profiled element 2 forming a tread is integrated, it is possible to liken the longitudinal direction X to the "circumferential" direction, the lateral direction Y to the "axial" direction, and the vertical direction Z to the "radial" direction.

Irrespective of the shape of the receiving surface 5, the extrusion head 4 will preferably have a substantially mating shape, so as to cover the receiving surface 5 over a shared overlap zone defining the gap 3. Thus, in particular, when the extrusion head 4 interacts with a roller 6, the extrusion head 4 will have a mating cylindrical overall shape which is circular-arc-shaped, preferably centred on the central axis Y6 of the roller 6.

The profiled element 2 is advantageously created continuously in the direction of its length, along the longitudinal direction X.

The concepts of "upstream" and "downstream" will be understood here with consideration to the overall flow direction of the profiled element 2, which progresses from upstream to downstream along the longitudinal direction X.

According to the invention, the extrusion head 4 comprises a first head portion 10 which is provided with one or more first intake channels 11 leading into the gap 3 in order to bring a first elastomeric compound M1 intended to form a sublayer 12 of the profiled element 2 into contact with the receiving surface 5.

If the profiled element 2 is intended to form a tread for a tire of a wheel, the sublayer 12 is intended to bear against and around the crown reinforcement of the tire in which the tread will be integrated.

Preferably, the sublayer 12 extends, along the lateral direction Y, over a cumulative width which represents more than 80% of the width W2 of the profiled element 2, preferably more than 90% of the width W2 of the profiled element 2. Within the profiled element 2 exiting the installation 1, the sublayer 12 could extend continuously over the cumulative width, or, in a preferable variant, be interrupted locally at locations which receive the inserts 33, as will be explained later on.

Preferably, the first elastomeric compound M1 is a non-vulcanized rubber-based compound.

The first head portion 10 also comprises, as can be clearly seen in FIGS. 3, 4, 6, 8 and 9A, at least one pre-scraper 13 which projects vertically into the gap 3 with delimitation, along the lateral direction Y, by a first lateral face 13L and a second lateral face 13R, and, along the vertical direction Z, by a lower face 13B which faces towards the receiving surface with positioning at a first predetermined, non-zero distance H13 from the receiving surface referred to as "pre-scraping thickness" H13, such that the pre-scraper 13 can reserve, within the stream of the first elastomeric compound M1, a trench 14 referred to as "embedding trench" 14.

Figure 8:
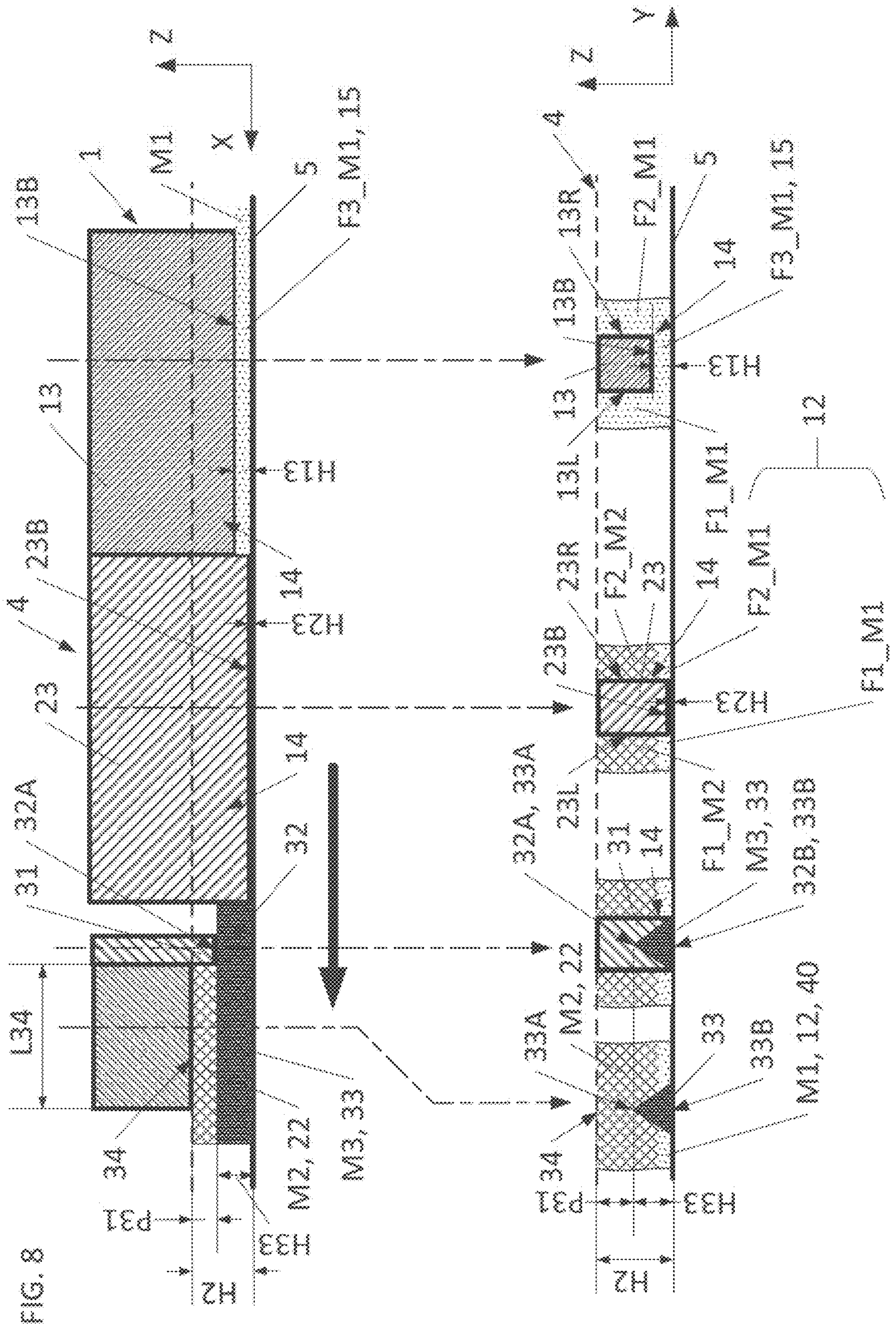
FIG. 8 illustrates, in a developed schematic view in section from the side accompanied by schematic views in corresponding outlet sections, the principle of embedding the insert according to the invention, according to which an embedding trench is created by pre-scraping and then scraping the first elastomeric compound, then injecting the third elastomeric compound forming the insert into the embedding trench, and then lastly covering the insert by filling the embedding trench by means of the second material making up the tread pattern block, such that the insert is integrated in the tread pattern block that it bolsters.

As can be seen in FIGS. 8 and 9A, the embedding trench 14 is bordered for the one part laterally by a first lateral substream F1_M1 of the first elastomeric compound and by a second lateral substream F2_M1 of the first elastomeric compound, which first and second lateral substreams flow on either side of the pre-scraper 13, respectively the first substream F1_M1 along the first lateral face 13L and the second substream F2_M1 along the second lateral face 13R of the pre-scraper 13, and for the other part vertically by a bottom substream F3_M1 which flows between the receiving surface 5 and the lower face 13B of the pre-scraper 13, in the pre-scraping thickness H13, to form a residual layer 15 of first elastomeric compound M1.

Thus, the pre-scraper 13 acts as a separator which splits the stream of first elastomeric compound M1 into multiple substreams F1_M1, F2_M1, F3_M1 which go around the pre-scraper 13 while the latter occupies the volume of the desired embedding trench 14.

By way of indication, the pre-scraping distance H13 will be less than or equal to 0.8 mm, and for example comprised between 0.6 mm and 2 mm.

Following the first head portion 10 in the flow direction, the extrusion head 4 comprises a second head portion 20 which is provided with one or more second intake channels 21 which lead into the gap 3 in order to feed a second elastomeric compound M2 intended, as can be seen in FIGS. 1, 8 and 9C, to cover the sublayer 12 of first elastomeric compound M1 coming from the first head portion 10.

Preferably, the second elastomeric compound M2 is a non-vulcanized rubber-based compound.

Within the profiled element 2 intended to form a tread, as illustrated in FIG. 1, the second elastomeric compound M2 will be intended to form the tread pattern blocks 22, which will come into contact with the roadway.

The second head portion 20 comprises at least one scraper 23 which extends in the longitudinal continuation of the pre-scraper 13, and which projects vertically into the gap 3 so as to have a first lateral face 23L, a second lateral face 23R, and a lower face 23B which faces towards the receiving surface 5, at a second vertical distance H23 from the receiving surface 5 referred to as "scraping thickness" H23, which scraping thickness H23 is strictly less than the pre-scraping thickness H13.

What is therefore obtained is: H23<H13.

In this way, for the one part the scraper 23 can laterally preserve the embedding trench 14 by making the stream of second elastomeric compound M2 form a first lateral substream F1_M2 of second elastomeric compound and a second lateral substream F2_M2 of second elastomeric compound, which flow respectively along the first lateral face 23L of the scraper 23 for the first substream F1_M2 and along the second lateral face 23R of the scraper 23 for the second substream F2_M2 and which form an added thickness of the first lateral substream F1_M1 of first elastomeric compound and the second lateral substream F1_M2 of first elastomeric compound, respectively, which come from the first head portion 10, whereas, for the other part, the scraper 23 makes it possible to vertically deepen the embedding trench 14 with a reduction, in accordance with the scraping thickness H23, in the thickness of the residual layer 15 of first elastomeric compound M1 at the bottom of the embedding trench 14.

Thus, the scraper 23 makes it possible to keep open the embedding trench 14 which was started previously by the pre-scraper 13, by maintaining, all along the second head portion 20 along the flow direction X, a lateral spacing for the one part between the first lateral substream F1_M1 of first elastomeric compound and the second lateral substream F2_M1 of first elastomeric compound that were initially separated by the pre-scraper 13, and for the other part a similar lateral spacing between the first lateral substream F1_M2 of second elastomeric compound and the second lateral substream F2_M2 of first elastomeric compound which, in the second head portion 20, are superposed on the lateral substreams F1_M1, F2_M1 of first elastomeric compound so as to form an overlayer at least partially covering the sublayer 12.

At the same time, the scraper 23 deepens the embedding trench 14 further in terms of depth.

In this regard, it will be noted that preferably the scraping distance H23 is chosen to be zero, such that, in the second head portion 20, the scraper 23, and more particularly the lower face 23B of the scraper 23, rubs against the receiving surface 5 so as to eliminate the residual layer of first elastomeric compound M1 at the bottom of the embedding trench 14.

Advantageously, the progressive nature of the scraping provided successively by a pre-scraper 13 and then by a scraper 23 makes it possible to divide and smoothly shape the sublayer 12 of first elastomeric compound M1, without excessive friction, this limiting the energy consumption necessary to drive the receiving surface 5 and avoiding any phenomenon of juddering or blocking of the receiving surface 5, and more particularly of the roller 6, and any phenomenon of the first elastomeric compound M1 jamming in the gap 3, or even any phenomenon of premature wear of the pre-scraper 13, of the scraper 23 or of the receiving surface 5.

The scraper 23 could preferably have a friction pad intended to come into sliding contact against the receiving surface 5, the friction pad being made of a material which has a low coefficient of friction in relation to the material making up the receiving surface 5. By way of example, the said friction pad could be made from a polymer of PTFE (polytetrafluoroethylene), POM (polyoxymethylene) or PEEK (polyetheretherketone) type, or else of a copper-based metal alloy.

Following the second head portion 20 in the flow direction, the extrusion head 4 has a third head portion 30 comprising at least one injector 31 which projects into the gap 3, in the longitudinal continuation of the scraper 23, and which has an injection opening 32 intended to inject a third elastomeric compound M3, distinct from the second elastomeric compound M2, so as to form an insert 33 in the embedding trench 14.

When the profiled element 2 is intended to form a tread, the insert 33 preferably makes up a circumferential reinforcer, referred to as "wedge", which makes it possible to bolster the tread pattern block 22 against lateral shear deformations, in order to improve the cornering behaviour of the tire.

Preferably, the third elastomeric compound M3 is a non-vulcanized rubber-based compound.

Advantageously, the injector 31 is located in the continuity of the scraper 23, the injector 31 makes it possible to deposit the third elastomeric compound M3 on the inside, and more particularly on the bottom, of the embedding trench 14, the volume of which has been cleared and shaped successively by the pre-scraper 13 and then by the scraper 23 that precede the injector 31.

In other words, the gradual deepening and shaping of the embedding trench 14 performed by the pre-scraper 13 and then the scraper 23 make it possible to precisely, reproducibly and cleanly prepare the location intended for the insertion of the insert 33.

Preferably, the injection opening 32, and consequently the resultant cross section of the insert 33, has a triangular shape, of which the base 32B, 33B is oriented towards the receiving surface 5, and preferably rests on the receiving surface 5, and of which the apex 32A, 33A is oriented towards the extrusion head 4.

Specifically, such a triangular cross section results in particularly stiff and stable bearing against the insert 33, which avoids the insert 33 shifting along the lateral direction Y and which thus allows the insert 33 to firmly support the tread pattern block 22 in relation to the shear forces when cornering, whilst still allowing the insert 33 to readily withstand, without undergoing excessive deformation, the compressive stresses exerted by the roadway, via the tread pattern block 22, along the vertical direction Z.

It will furthermore be noted that, when the scraper 23 rubs against the receiving surface 5 in contact with it and thus locally interrupts the sublayer 12 along the lateral direction Y, at the location of the embedding trench 14, by eliminating the residual layer of first elastomeric compound M1 at the bottom of the embedding trench 14 as was mentioned above, this advantageously allows the injector 31 of the third head portion 30 to place the insert 33 made of third elastomeric compound M3 in contact with the receiving surface 5.

Such a preferable arrangement advantageously affords the insert 33 a good, stable and stiff seat, which insert can thus notably, if the profiled element 2 makes up a tread, rest directly on the crown reinforcement of the tire, underlying the tread.

It will be noted that, if the scraper 23 does not rub against the receiving surface 5 and allows a thin layer of first elastomeric compound M1 to remain below the insert 33, this can allow the sublayer 12 to keep its continuity, and, if appropriate, to keep its continuity over the entire cumulative length occupied by the sublayer 12, along the lateral direction Y, within the profiled element. Conversely, if the scraper 23 rubs against the receiving surface as is preferred to ensure a better seat for the insert 33, then the sublayer 12 will be locally interrupted, at the location of each insert 33 in question. Preferably, however, the sublayer 12 will then extend continuously, along the lateral direction, outside the locations at which the sublayer 12 is interrupted to accommodate an insert 33.

Furthermore, the third head portion 30 moreover comprises, following the injector 31 in the longitudinal direction X, a covering wall 34 which extends over a predetermined length L34 referred to as "confluence length" L34 along the longitudinal direction X, from the injection opening 32 to the outlet of the gap 3, in order that the flow of the profiled element 2 below the covering wall 34 allows the first lateral substream F1_M2 of second elastomeric compound and the second lateral substream F2_M2 of second elastomeric compound to close up over the insert 33, thus filling the embedding trench 14.

Thus, on account of the embedding trench 14 being filled in by means of the second elastomeric compound M2, the insert 33 is perfectly integrated within the tread pattern block 22 formed by the second elastomeric compound M2, in a position which can be freely chosen, along the lateral direction Y, by determining the appropriate location for the injector 31 in the lateral direction Y.

By way of indication, the shortest distance which separates, along the lateral direction Y, the insert 33 integrated in a tread pattern block 22 from the lateral edge 22L, 22R of the tread pattern block 22 which is closest to the insert 33, could be comprised between 3 mm and 12 mm, and/or equal to or greater than 20%, or even 30% of the overall width of the tread pattern block 22.

Advantageously, the embedding of the insert 33 substantially half way along the width of the tread pattern block 22 allows one and the same insert 33 to laterally support the tread pattern block 22 effectively in the two directions by limiting the shear and the shifting of the tread pattern block 22 both towards the left and towards the right, this conferring better cornering behaviour on the tread pattern block 22. When the tread pattern block 22 extends, along the lateral direction Y, from a first lateral edge 22L to a second lateral edge 22R, the base 33B of the insert 33 could thus preferably be located at a non-zero distance, and preferably substantially at the same non-zero distance, from each of the lateral edges 22L, 22R, as can be seen notably in FIG. 1.

In absolute terms, the invention could be applied to the production of a profiled element 2 within which the apex 33A of the insert 33 is flush with the upper surface 22U of the tread pattern block 22 formed by the second elastomeric compound M2. To that end, all that would be necessary would be to make the height of the covering wall 34, considered in relation to the receiving surface 5 along the vertical direction Z, coincide with the apex 32A of the injection opening 32, and thus with the apex 33A of the insert 33, such that the first lateral substream F1_M2 of second elastomeric compound comes together with one of the lateral walls of the insert 33 while the second lateral substream F2_M2 of second elastomeric compound comes together with the opposite lateral wall of the insert 33, and that the apex 33A of the insert marks the boundary between the first lateral substream F1_M2 of second elastomeric compound and the second lateral substream F2_M2 of second elastomeric compound.

However, particularly preferably, and as illustrated in FIGS. 1, 5, 7, 8, 9D and 9E, the injector 31 is arranged so as to position the point 32A of the injection opening 32, referred to as "apex 32A of the injection opening", that is furthest away from the receiving surface 5, along the vertical direction Z, and that thus corresponds to the apex 33A of the insert 33, at a non-zero vertical distance P31 from the covering wall 34, referred to as "embedding depth" P31, such that the first lateral stream F1_M2 of second elastomeric compound and the second lateral stream F2_M2 of second elastomeric compound can meet and fuse in the space which is vertically comprised between the apex 33A of the insert and the covering wall 34, in order to embed the insert 33 in the second elastomeric compound M2 at the predetermined embedding depth P31.

Thus, when the embedding trench 14 is being filled, the first and second lateral substreams F1_M2, F2_M2 of second elastomeric compound will preferably be made to join one another, above the peak 33A of the insert, such that this confluence of the first and second lateral substreams F1_M2, F2_M2 of second elastomeric compound will have the effect not only of bringing the second elastomeric compound M2 together with the lateral walls of the insert 33 but also and especially, more generally, of covering the insert 33 under a layer of second elastomeric compound M2, the non-zero thickness of which corresponds to the embedding depth P31.

In such an arrangement, the distance which vertically separates the apex 33A of the insert from the receiving surface 5 is thus strictly less, here by a value equal to the embedding depth P31, than the distance, corresponding here to the overall thickness H2 of the profiled element 2, which vertically separates the upper face 22U of the tread pattern block 22 from the receiving surface 5 vertically in line with the apex 33A of the insert.

Advantageously, by embedding the insert 33 vertically recessed in the radially external, visible upper face 22U of the tread pattern block 22, at a predetermined non-zero embedding depth P31 which in practice separates the apex 33A of the insert from the roadway, the insert 33 making direct contact with the roadway and thus interfering with the function performed by the tread pattern block 22 is avoided.

Advantageously, it is possible to freely choose the embedding depth P31, and thus the vertical positioning of the insert 33 within the tread pattern block 22, by adapting the dimensions of the injector 31, and more generally by adapting the dimensions of the third head portion 30, so as to position the apex 32A of the injection opening 32 in vertical projection from the covering wall 34, by a value corresponding to the desired embedding depth P31, such that the apex 32A of the injection opening 32 is at a distance from the receiving surface 5 which is less, along the vertical direction Z, than the distance separating the receiving surface 5 from the covering wall 34.

By way of indication, the embedding depth P31 will preferably be comprised between 3 mm and 8 mm, and more preferably comprised between 5 mm and 7 mm.

By way of indication, and notably when the profiled element 2 is intended to form a tread for a tire intended for a passenger vehicle, the dimensions of which correspond to rims of 15 inches to 20 inches, the thickness H2 of the profiled element will preferably be comprised between 6 mm and 12 mm.

Similarly, the width W2 of the profiled element 2 will preferably be comprised between 150 mm and 350 mm.

Preferably, the height H33 of the apex 33A of the insert in relation to the receiving surface 5 represents between 30% and 60%, or even between 40% and 50%, of the height of the upper face 22U of the corresponding tread pattern block 22, and more generally of the overall thickness H2 of the profiled element 2.

Preferably, the injection opening 32 is located on the downstream face of the injector 31, that is to say on the trailing edge of the injector 31, which marks the confluence point from which the lateral substreams F1_M2, F2_M2 of second elastomeric compound and the flow of third elastomeric compound M3 forming the insert 33 meet.

Preferably, the base 32B of the injection opening 32 is slightly recessed in the receiving surface 5 along the vertical direction Z, for example at a distance comprised between 0.5 mm and 0.8 mm from the receiving surface 5, in order to avoid the injector 31 rubbing against the receiving surface 5. The base 32B of the injection opening 32 will then preferably be fully open, such that the third elastomeric compound M3 which emerges from it can be placed directly against the bottom of the embedding trench 14, and more particularly in direct contact with the receiving surface 5.

As regards the covering wall 34, and more particularly the confluence length L34 defined by the covering wall, along the longitudinal direction X, between the injection opening 32 and the outlet of the gap 3 where the extrusion head 4, and more specifically where the covering wall 34, terminates or at the very least is far enough away from the receiving surface 5 to release the profiled element 2 and relax the compressive stress exerted by the covering wall 34 on the profiled element along the vertical direction Z, the inventors have found that it is necessary for the confluence length L34 to be, for the one part, long enough for the first and second lateral substreams F1_M2, F2_M2 of second elastomeric compound to satisfactorily meet the insert 33, and more particularly, when the lateral substreams of second elastomeric compound are brought together with one another above the insert 33, such that the lateral substreams F1_M2, F2_M2 of second elastomeric compound perfectly adhere to one another without allowing a zone of fragility or even a fissure (crack) to remain in their joining plane, vertically in line with the peak 33A of the insert, and, for the other part, nevertheless short enough to avoid the second elastomeric compound M2, and more particularly the layer of second elastomeric compound M2 which reforms above the insert 33, from causing vertical breakage, and thus undesirable deformation, of the insert 33, notably excessive compression of the point of the apex 33A of the insert 33.

That is why, preferably, the confluence length L34 covered by the covering wall 34 is comprised between 10 mm and 14 mm.

This range of values is in particular applicable to a profiled element 2 of which the overall thickness H2 is comprised between 6 mm and 12 mm as indicated above, and of which the height H33 of the apex 33A of the insert 33, considered in relation to the receiving surface 5, is equal or preferably strictly less than the thickness H2, for example less than or equal to 60%, or less than 50%, of the thickness H2. By way of example, the invention could notably be applied to a profiled element of which the thickness H2 is comprised between 10 mm and 12 mm and of which the one or more inserts 33 will have a height H33 comprised between 5 mm and 7 mm.

The inventors have also found that it appears to be the case that the greater the height H33 of the insert 33 is, and therefore the smaller the thickness of the layer of second elastomeric compound M2 covering the apex 33A of the insert is, that is to say the smaller the embedding depth P31 (albeit not zero) is, the more it is necessary to provide an increased confluence length L34 (therefore which, here, tends towards or even amounts to 14 mm), whereas, when the height H33 of the insert 33 is smaller, and thus when the embedding depth P31 is greater, it is possible to reduce the confluence length L34 (here to make it tend towards, or even equal, 10 mm).

Once the confluence length L34 has passed under the covering wall 34, the profiled element 2 leaves the gap 3 and is thus released at ambient atmospheric pressure. The profiled element 2 can then cool down and be dimensionally stabilized on the remainder of the receiving surface 5, then on a conveyor (not shown), such as a roller or belt conveyor, which takes up the profiled element after the receiving surface 5.

It will furthermore be noted that, for the convenience of the description and to avoid any confusion, reference is made preferably to a corresponding pre-scraper 13, to a corresponding scraper 23, to a corresponding embedding trench 14, to a corresponding injector 31 and to a corresponding insert 33. That being said, of course, it would preferably be possible to provide, as illustrated in the various figures, multiple assemblies, each of which connects a pre-scraper 13 and a scraper 23 in series, the assemblies being distributed at a distance from one another over the width of the gap 3 so as to deepen as many embedding trenches 14 distributed over the width W2 of the profiled element as possible and which will make it possible to insert as many inserts 33 as possible by means of as many injectors 31 as possible into a plurality of tread pattern blocks 22. The features of the various elements of the same nature will be inferred preferably in an identical way to what has been described above.

Figure 3:
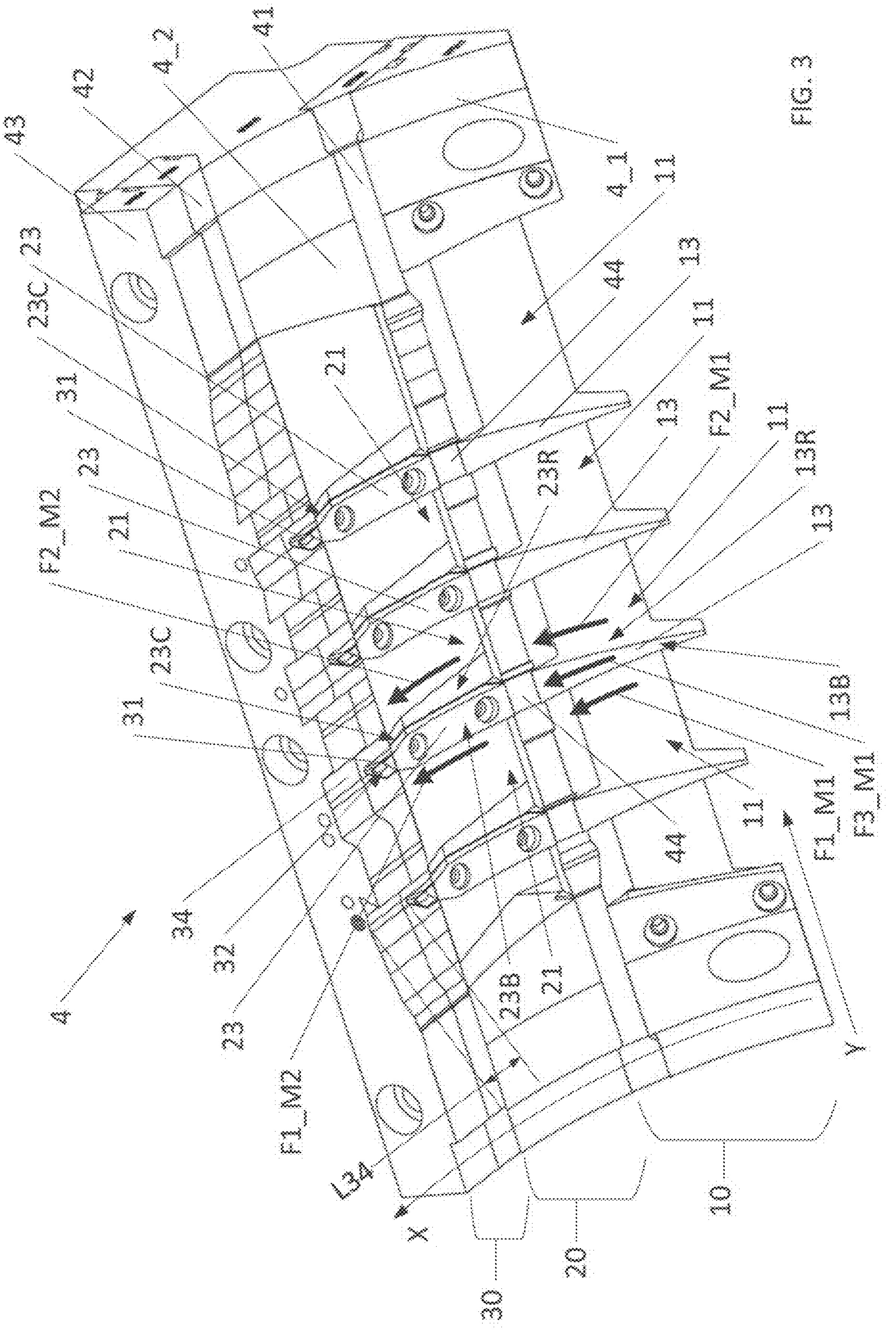
FIG. 3 illustrates a perspective view from below of the extrusion head of the installation of FIG. 2.
Figure 4:
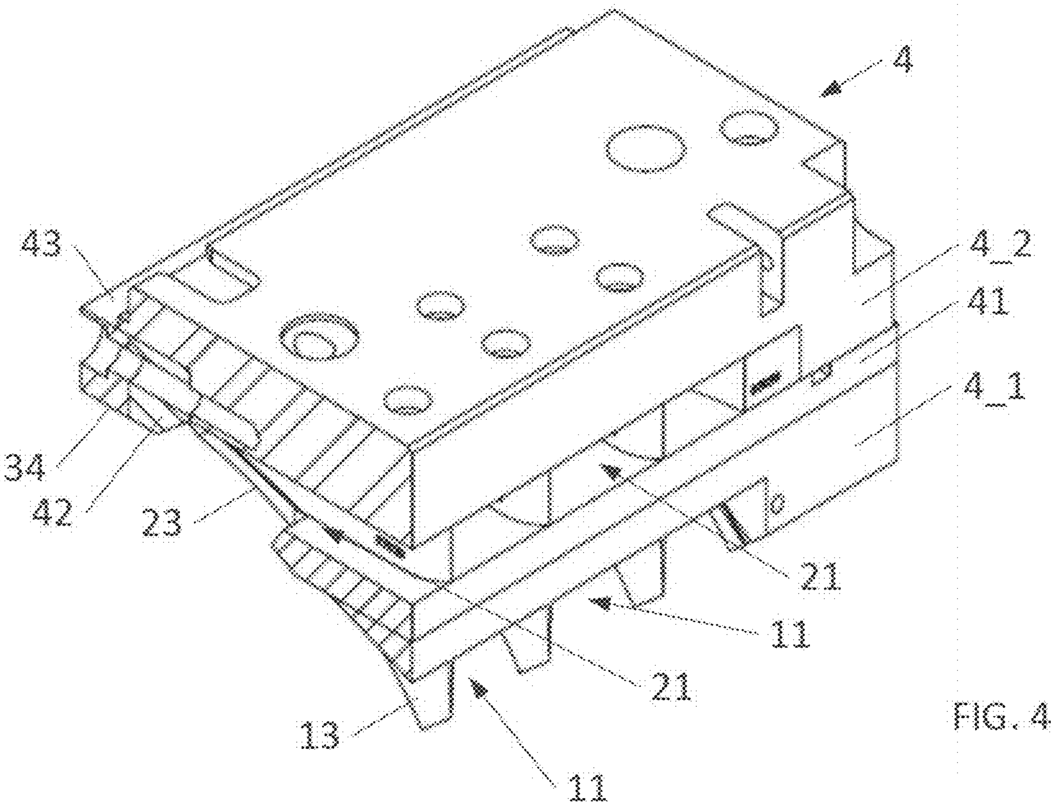
FIG. 4 illustrates a back view in perspective, with material removed, of the detail of the extrusion head of FIG. 3.
Figure 5:
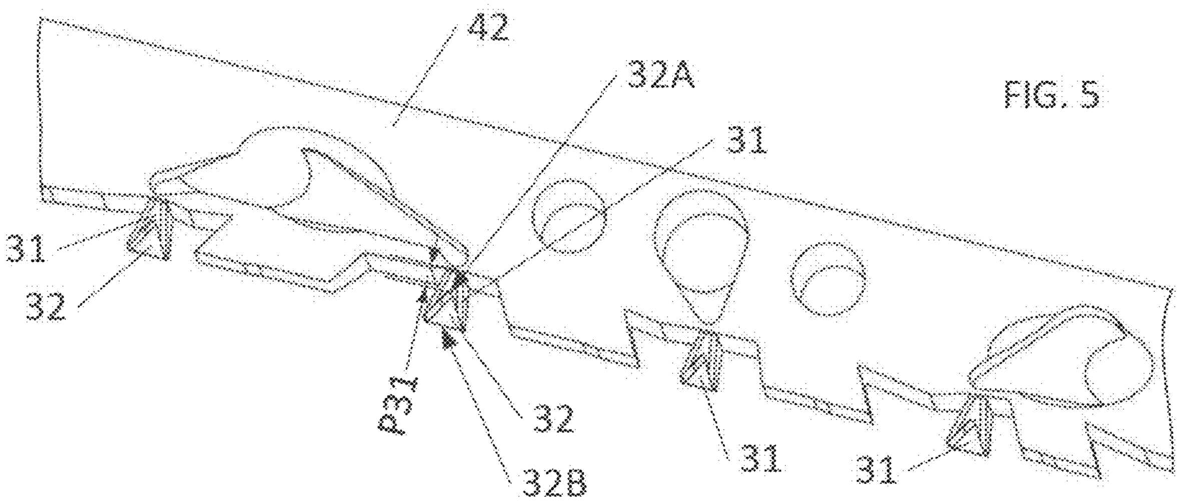
FIG. 5 illustrates a perspective view of a detail of a blade with which the third portion of the extrusion head of FIGS. 2 to 4 is equipped and which bears a plurality of injectors, each of which is intended to create a reinforcing insert.
Figure 6:
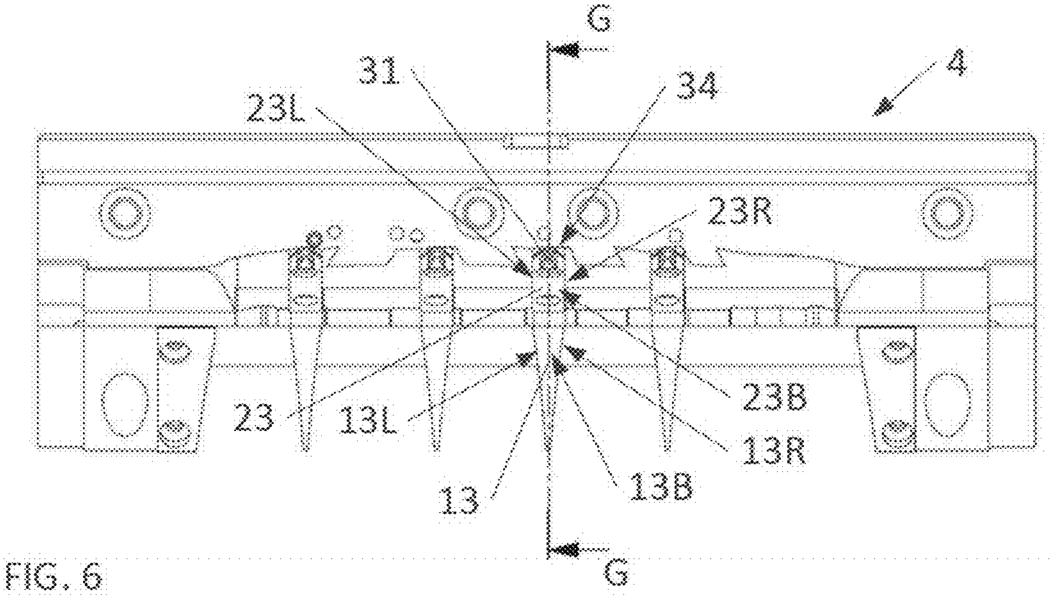
FIG. 6 illustrates a front view of the extrusion head of FIGS. 2 to 5.
Figure 7:
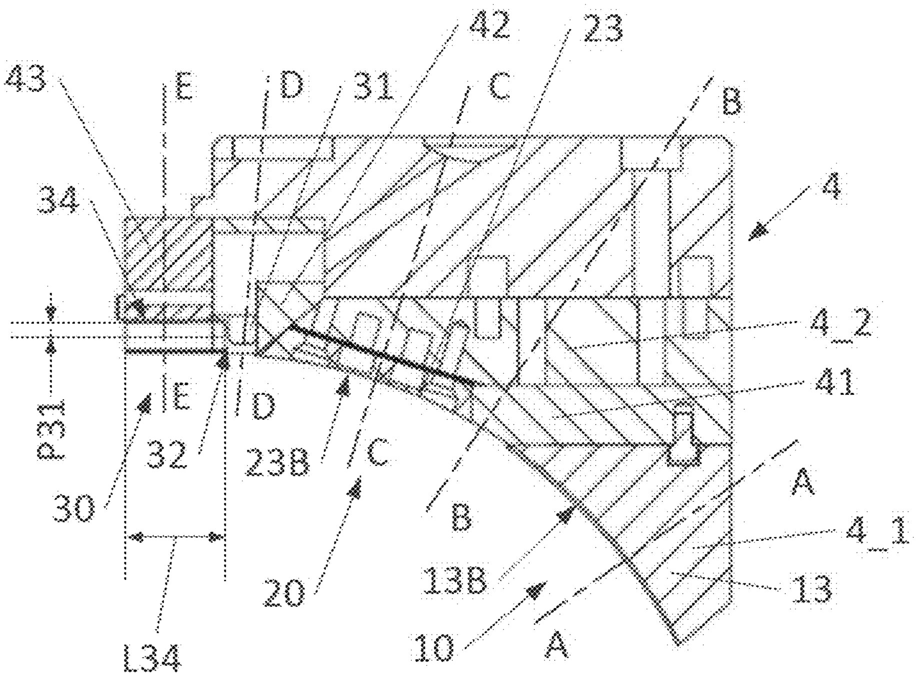
FIG. 7 illustrates a side view in section of the extrusion head of FIG. 6.

For the convenience of the design, the extrusion head 4 will preferably have a modular structure, and will preferably, for example, comprise:

a first module 4_1 forming the first head portion 10, a second module 4_2 forming the second head portion 20, a first blade 41 referred to as "transition blade" 41 which is interposed between the first module 4_1 and the second module 4_2 to ensure a transition between the first portion 10 and the second portion 20, and more particularly to ensure, before the stream of first elastomeric compound M1 enters the second portion 20 of the extrusion head, that the sublayer 12 made of first elastomeric compound M1 is pre-shaped, a second blade 42, which forms the upstream part of the third portion 30 of the extrusion head 4, and which bears the one or more injectors 31, as can be seen in FIGS. 5 and 9D, and a third blade 43, which is attached to the second blade 42 and forms the downstream part of the third head portion 30 and, to that end, comprises the covering wall 34 which is vertically in line with the insert 33, as can be seen in FIGS. 3, 7 and 9E.

The modules 4_1 and 4_2 and blades 41, 42, 43 will be assembled and secured to one another, preferably by screwing, and contiguous with one another in order to ensure the continuity of the extrusion head 4 along the longitudinal direction X.

It will be noted that, as can be seen notably in FIG. 9B, the first blade 41 preferably comprises teeth 44 which form terminal longitudinal extensions of the pre-scrapers 13, and can thus be likened to the pre-scrapers 13 in functional terms, which teeth 44 make it possible, for the one part, to force the bottom substream F3_M1, which forms the residual sublayer 15 making up the bottom of the embedding trench 14, to keep substantially the value of the pre-scraping thickness H13 that was given to it by the pre-scraper 13 that precedes the tooth 44 in question, and, for the other part, to divide and streamline the first and second lateral substreams F1_M1, F2_M1 of first elastomeric compound on each side of the embedding trench 14 so as to define a sublayer bottom 40 which is intended to receive the second elastomeric compound M2 and thus to provide the tread pattern blocks 22 with a securing base.

Preferably, in the first head portion 10, the width of the pre-scraper 13, considered along the lateral direction Y, increases from upstream to downstream in the flow direction, as can be clearly seen in FIG. 3.

As a result, the pre-scraper 13 overall forms a divergent stem in relation to the flow direction, this making it possible to gradually divide the first elastomeric compound M1 into the first lateral substream F1_M1 and the second lateral substream F2_M1.

Advantageously, the free space which separates two neighbouring pre-scrapers 13 along the lateral direction Y thus forms a funnel which makes the first elastomeric compound M1 converge towards the corresponding tooth 44 of the first blade 41, in order to promote smooth shaping of the sublayer bottom 40 which will then support the tread pattern blocks 22 made of second elastomeric compound M2.

Preferably, in the second head portion 20, the scraper 23 has a convergent portion 23C which connects to the injector 31 and the width of which, considered along the lateral direction Y, narrows from upstream to downstream in the flow direction.

As a result, the cross section of the scraper 23, and thus of the embedding trench 14, progressively narrows so as to get gradually closer to a width equal to, or close to, the width of the base 33B of the insert 33. This notably allows the first and second lateral substreams F1_M2, F2_M2 of second elastomeric compound to smoothly and laminarly join, in the third head portion 30, the flow of third elastomeric compound M3 forming the insert 33, without the first and second lateral substreams F1_M2, F2_M2 needing to suddenly become laterally discontinuous, which could disrupt the proper flow of the streams or disturb the shaping of the insert 33.

By way of indication, the maximum width of the scraper 23, and thus of the embedding trench 14, in the second head portion 20, with upstream limitation of the convergent portion 23C of the scraper 23, could be chosen between twice and three times the width of the base 33B of the desired insert 33, for example equal to 2.6 times the width of the base 33B. Specifically, such proportions make it possible to optimize the effectiveness of the scraping.

Similarly, from a hardware perspective in terms of the dimensioning of the tool, the maximum width of the scraper 23 could be substantially comprised between twice and three times the width of the base 32B of the injection opening 32.

Advantageously, the invention will make it possible to use a first, a second and a third elastomeric compound M1, M2, M3 which will have different compositions from one another, and therefore distinct mechanical properties, even though preferably all these elastomeric compounds M1, M2, M3 will be based on non-vulcanized rubber.

More particularly, use could be made of a third elastomeric compound M3, intended to form the reinforcing inserts 33, which intrinsically has a greater stiffness than that of the second elastomeric compound M2 which is intended to form the tread pattern blocks 22, which second elastomeric compound M2 is thus intentionally softer.

The accepted parameter for characterizing and selecting the elastomeric compounds M1, M2, M3 will preferably be the complex dynamic shear modulus, denoted G*.

As a result, a third elastomeric material M3, used for the inserts 33, of which the complex dynamic shear modulus G*_M3 is strictly greater than that G*_M2 of the second elastomeric compound M2, used here for the tread pattern blocks 22, will advantageously be chosen. Similarly, the complex dynamic shear modulus G*_M3 of the third elastomeric compound M3 making up the inserts 33 will preferably be strictly greater than that G*_M1 of the first elastomeric compound M1 used for the sublayer 12.

This is because the complex dynamic shear modulus G* is representative of the stiffness of the elastomeric compound in question, and characterizes the behaviour of the elastomeric compound in question when the latter is subjected to an alternating shear stress. The complex dynamic shear modulus G* has, in its representation in the complex plane, a real part, also called the "elastic part" and denoted G', which characterizes the elastic behaviour of the compound, and an imaginary part, also called the "viscous part" and denoted G", which characterizes the energy dissipation due to the viscous behaviour of the compound.

The term "dynamic loss", or "viscoelastic loss", denoted Tgδ, designates the ratio of the viscous part G" to the elastic part G', that is to say the tangent of the argument δ of the complex dynamic shear modulus G*: Tgδ=Tan(δ)=Tan(Arg(G*))=G"/G'.

The viscoelastic loss Tgδ and the complex dynamic shear modulus G* may be determined according to the ASTM D 5992-96 standard, by measuring the dynamic properties of the elastomeric compound with a viscoanalyser (a Metravib VA4000 in this case). The dynamic properties are measured in a sample of elastomeric compound that has been vulcanized, in this case more particularly vulcanized in the curing conditions applicable to the tire incorporating the profiled element 2, the sample taking the form of a cylindrical test specimen with a thickness equal to 2 mm and a cross section equal to 78.5 $mm^2$. The response of the sample of elastomeric compound to a simple alternating sinusoidal shear stress, having a peak-to-peak amplitude equal to 0.7 MPa and a frequency equal to 10 Hz, is recorded.

A temperature scan with a constant rate of temperature rise of +1.5° C./min is also carried out during this measurement operation. The glass transition temperature Tglass of the sample is the temperature at which the dynamic loss Tgδ reaches a maximum during the temperature scan.

The value of G* measured at 23° C., or at 60° C. if appropriate, is representative of the stiffness of the elastomeric compound in question, that is to say its resistance to deformation, notably its elastic deformation.

It will be noted that, in addition to the parameters that are actually accepted for measuring the complex dynamic shear modulus G* of each elastomeric compound, if the measurement parameters are identical, it is the order of magnitude and the relative value of the modulus G* from one elastomeric compound to another that are important for quantifying the stiffness of the elastomeric compound in relation to the other elastomeric compounds, and therefore the behaviour of the elastomeric compound in the vulcanized tire.

By way of indication, the elastomeric compounds M1, M2, M3 could be chosen such that, in the vulcanized state, they have complex dynamic shear moduli respectively comprised between 0.5 MPa and 5 MPa for the first elastomeric compound M1, between 0.9 MPa and 5 MPa for the second elastomeric compound M2, and between 40 MPa and 60 MPa for the third elastomeric compound M3, the complex dynamic shear moduli G* in this instance being measured at 60° C. in accordance with the standard recalled above.

The invention, of course, relates as such to a method for manufacturing a profiled element 2, and more particularly a profiled element 2 intended to form a tread of a tire for a vehicle wheel.

As a result, the invention notably concerns a method for manufacturing a profiled element 2, in the course of which method a pre-scraper 13 is used to open an embedding trench 14 in a first elastomeric compound M1 making up a sublayer 12 of the profiled element 2, then a second elastomeric compound M2 is fed so as to cover the sublayer 12, whilst still preserving the embedding trench 14 within the first and second elastomeric compounds M1, M2 by virtue of a scraper 23, then a third elastomeric compound M3 making up an insert 33 is deposited in the embedding trench 14, and then the second elastomeric compound M2 is allowed to fill the embedding trench 14 in order to coat the insert 33.

Preferably, as described above, in the course of this method the second elastomeric compound M2 covers the embedding trench 14 and the insert 33 so as to embed the apex of the insert 33 to a non-zero embedding depth P31 preferably comprised between 3 mm and 8 mm.

Preferably, the method is implemented to manufacture a profiled element 2 intended to form a tread of a tire for a vehicle wheel, within which profiled element 2 the first elastomeric compound M1 forms a sublayer 12 intended to be secured to a crown reinforcement of the tire, the second elastomeric compound M2 is intended to form tread pattern blocks 22 that come into contact with the road, and the insert made of third elastomeric compound M3 is intended to form a circumferential reinforcer within the tread.

Preferably, the complex dynamic shear modulus G*_M3 of the third elastomeric compound M3 is strictly greater than the complex dynamic shear modulus G*_M2 of the second elastomeric compound M2.

As indicated above, this will make it possible to confer greater stiffness on the reinforcing insert 33, and greater flexibility to the tread pattern block 22.

Preferably, the elastomeric compounds M1, M2, M3 could be chosen such that they have complex dynamic shear moduli within the ranges of values indicated above.

Of course, the method for manufacturing a profiled element 2 described above preferably implements an installation 1 as described in the above text to manufacture the profiled element 2.

In a preferred application option, the invention concerns a method for manufacturing a tire for a vehicle wheel, in the course of which method a profiled element 2 is manufactured according to the above method for manufacturing a profiled element, and the profiled element 2 is used to form the tread of the tire.

In a preferred option for implementing the method for manufacturing a tire for a vehicle wheel, it could be provided that at least one wear indicator 50 for monitoring the state of wear of the tire is shaped in at least one of the tread pattern blocks 22 formed in the second elastomeric compound M2, this being done such that the apex 33A of the insert 33 formed from the third elastomeric compound M3 has a height H33, in relation to the receiving surface and along the vertical direction Z, or, more particularly within the finished tire, a radial distance from the axis of the tire, which is strictly less than the height H50 (respectively slightly less than the radial distance from the axis) of the wear indicator 50 such that, when the tire is in use, the wear indicator 50 is reached before the apex 33A of the insert embedded in the at least one of the tread pattern blocks 22 is uncovered.

Advantageously, this allows the reinforcing insert 33 to comprehensively perform its function of managing cornering throughout the service life of the tire, without being exposed on the visible face of the tread and therefore without interfering with the road.

Figure 10:
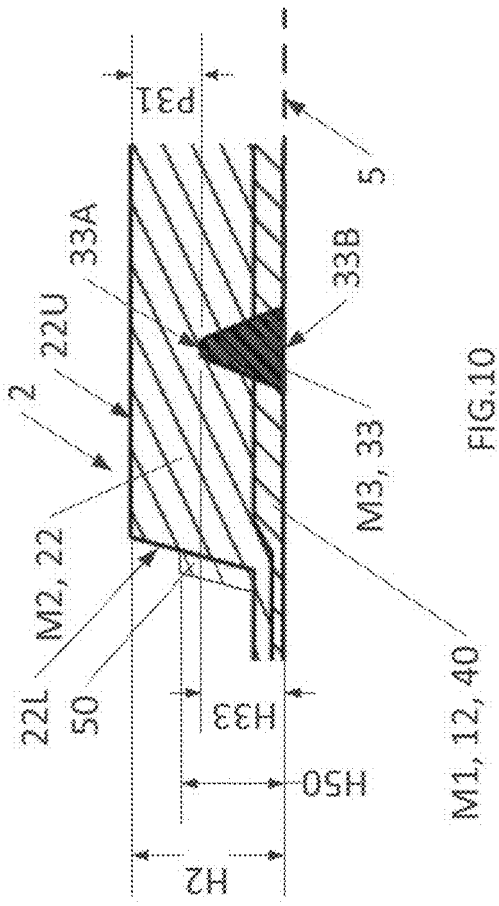
FIG. 10 illustrates a partial view of the cross section through a profiled element variant according to the invention, including a wear indicator which has, in relation to the receiving surface, an intermediate height between the upper height of the tread pattern block and the lower height of the reinforcing insert.

The wear indicator 50 could preferably be obtained while the tire is being moulded in a vulcanization press, at the join between the visible lateral edge 22L of a tread pattern block 22 and the bottom of the circumferential groove 51 that is bordered by the tread pattern block 22, as can be seen in FIG. 10, by shaping the lateral edge 22L in the vulcanization press.

Furthermore, after the coextrusion of the profiled element 2, the profiled element could possibly be supplemented by laterally attaching, to certain tread pattern blocks 22, auxiliary reinforcers 52, for example of triangular cross section, as indicated in dashed lines in FIG. 1.

As a result, preferably, in the course of the method for manufacturing a tire according to the invention, it would be possible to produce the profiled element 2 such that the profiled element 2 comprises at least one tread pattern block 22 which is delimited along the lateral direction Y by at least one lateral edge 22L, 22R and which comprises an insert 33 embedded in the tread pattern block 22 at a distance from the at least one lateral edge 22L, 22R, and an auxiliary reinforcer 52, preferably of triangular cross section, is added against the at least one lateral edge 22L, 22R of the tread pattern block 22.

Preferably, the height of the apex of the auxiliary reinforcer 52 will be strictly greater than the height H33 of the apex of the embedded insert 33, and, more preferably, the apex of the auxiliary reinforcer 52 will be flush with the upper face 22U of the tread pattern block 22.

Preferably, the base of the auxiliary reinforcer 52 will rest directly on the sublayer 12 made of first elastomeric compound M1. More preferably, the base of the auxiliary reinforcer 52 will preferably rest on a portion referred to as "intermediate" portion of the sublayer 12 made of first elastomeric compound M1, which sublayer intermediate portion ensures, along the lateral direction Y, the continuity of the sublayer 12 with the sublayer bottoms 40 serving as seats to the tread pattern blocks 22, and in particular the continuity of the sublayer 12 under the grooves 51. It will furthermore be noted that the thickness of the sublayer 12 may be less, in the one or more intermediate portions located under the one or more auxiliary reinforcers 52 and/or at the bottom of the one or more grooves 51, than the thickness of the sublayer 12 in the sublayer bottoms 40 which bear the tread pattern blocks 22.

Preferably, the auxiliary reinforcer 52 will be formed in an elastomeric compound, preferably based on raw rubber, which, once it has been vulcanized, has a complex dynamic shear modulus G* strictly greater than that G*_M2 of the second elastomeric compound M2 making up the tread pattern block 22, in order to have a greater stiffness, and thus to be able to contribute to supporting and stiffening the tread pattern block 22 with regard to cornering.

Similarly, preferably, the complex dynamic shear modulus G* of the auxiliary reinforcer 52 will be strictly greater than that G*_M1 of the first elastomeric compound M1 making up the sublayer 12.

The auxiliary reinforcer 52 could be added to the raw profiled element 2, after the profiled element 2 has been produced by coextrusion, by integrating, for example by rolling, the auxiliary reinforcer 52 at the location reserved to that end in the profiled element 2, against the lateral edge 22L, 22R of the tread pattern block 22 in question. The whole will then be vulcanized, while the tire is being cured.

Advantageously, the combination of an insert 33 embedded in the tread pattern block 22 and a lateral auxiliary reinforcer 52 placed at the interface between the tread pattern block 22 and the circumferential groove 51 makes it possible to optimize the cornering behaviour of the tread pattern block 22 in question.

Of course, the invention as such also concerns a profiled element 2 obtained as indicated above, and a tire, notably a pneumatic tire, provided with such a profiled element 2.

In particular, the invention could concern a profiled element 2 comprising one or more inserts 33 each embedded in a tread pattern block 22, a profiled element 2 referred to as "improved profiled element" combining one or more inserts 33 each embedded in a tread pattern block 22 with one or more auxiliary reinforcers 52 as described above, and also, lastly, to a tire for a vehicle wheel having a tread formed by such an improved profiled element 2.

Lastly, the invention is not limited in any way to the sole embodiment variants described in the above text, and those skilled in the art will notably be capable of freely separating or combining any one or other of the aforementioned features, or replacing them with equivalents.

What is claimed is:

1. A coextrusion installation intended for generating a profiled element by conjointly extruding a plurality of elastomeric compounds along a shared flow direction which corresponds to a longitudinal direction of the profiled element, the installation comprising an extrusion head which feeds the elastomeric compounds, and a receiving surface which is positioned facing the extrusion head in order to define a gap serving to shape a cross section of the profiled element, in terms of a thickness along a vertical direction, which is perpendicular to the longitudinal direction and to the receiving surface, and in terms of a width along a lateral direction, which is perpendicular to the longitudinal direction and to the vertical direction, wherein the extrusion head comprises, from upstream to downstream along the shared flow direction:

a first head portion, which is provided with one or more first intake channels leading into the gap in order to bring a first elastomeric compound, intended to form a sublayer of the profiled element, into contact with the receiving surface, the first head portion also comprising at least one pre-scraper which projects vertically into the gap with delimitation, along the lateral direction, by a first lateral face and a second lateral face, and, along the vertical direction, by a lower face which faces towards the receiving surface with positioning at a pre-scraping thickness which is a first, predetermined non-zero distance from the receiving surface, such that the at least one pre-scraper can reserve, within a stream of the first elastomeric compound, an embedding trench which is bordered for one part laterally by a first lateral substream of the first elastomeric compound and by a second lateral substream of the first elastomeric compound, which first and second lateral substreams flow on either side of the at least one pre-scraper, along the first lateral face and along the second lateral face of the at least one pre-scraper, respectively, and for another part vertically by a bottom substream which flows between the receiving surface and the lower face of the at least one pre-scraper, in the pre-scraping thickness, to form a residual layer of first elastomeric compound;

a second head portion which is provided with one or more second intake channels which lead into the gap in order to feed a second elastomeric compound intended to cover the sublayer of first elastomeric compound coming from the first head portion, the second head portion comprising at least one scraper which extends in a longitudinal continuation of the at least one pre-scraper, and which projects vertically into the gap so as to have a first lateral face, a second lateral face, and a lower face which faces towards the receiving surface, at a scraping thickness which is a second vertical distance from the receiving surface which is strictly less than the pre-scraping thickness, such that, for one part, the at least one scraper can laterally preserve the embedding trench by making a stream of second elastomeric compound form a first lateral substream of second elastomeric compound and a second lateral substream of second elastomeric compound, which flow along the first lateral face and along the second lateral face, respectively, of the at least one scraper and which form an added thickness of the first and the second lateral substream of first elastomeric compound, respectively, which come from the first head portion, whereas, for another part, the at least one scraper makes it possible to vertically deepen the embedding trench with a reduction, in accordance with the scraping thickness, in the thickness of the residual layer of first elastomeric compound at the bottom of the embedding trench; and and a third head portion comprising at least one injector which projects into the gap, in a longitudinal continuation of the at least one scraper, and which has an injection opening intended to inject a third elastomeric compound, distinct from the second elastomeric compound, so as to form an insert in the embedding trench, the third head portion moreover comprising, following the at least one injector in the longitudinal direction, a covering wall which extends over a predetermined confluence length along the longitudinal direction, from the injection opening to an outlet of the gap, in order that the flow of the profiled element below the covering wall allows the first and second lateral substreams of second elastomeric compound to close up over the insert, thus filling the embedding trench, wherein the at least one injector is arranged so as to position a point of the injection opening that is furthest away from the receiving surface, along the vertical direction, and that thus corresponds to an apex of the insert, at an embedding depth which is a non-zero vertical distance from the covering wall, such that the first lateral stream of second elastomeric compound and the second lateral stream of second elastomeric compound can meet and fuse in a space which is vertically comprised between the apex of the insert and the covering wall, in order to embed the insert in the second elastomeric compound of the embedding depth.

2. The installation according to claim 1, wherein the scraping thickness is zero, such that, in the second head portion, the at least one scraper rubs against the receiving surface so as to eliminate the residual layer of first elastomeric compound at the bottom of the embedding trench, in order to allow the at least one injector of the third head portion to place the insert made of third elastomeric compound in contact with the receiving surface.

3. The installation according to claim 1, wherein the embedding depth is comprised between 3 mm and 8 mm.

4. The installation according to claim 1, wherein the confluence length covered by the covering wall is comprised between 10 mm and 14 mm.

5. The installation according to claim 1, wherein, in the first head portion, a width of the at least one pre-scraper, considered along the lateral direction, increases from upstream to downstream in the flow direction.

6. The installation according to claim 1, wherein, in the second head portion, the at least one scraper has a convergent portion which connects to the at least one injector and a width of which, considered along the lateral direction, narrows from upstream to downstream in the flow direction.

7. The installation according to claim 1, wherein the injection opening, and consequently a resultant cross section of the insert, has a triangular shape, of which a base is oriented towards the receiving surface and an apex is oriented towards the extrusion head.

8. The installation according to claim 1, wherein the receiving surface is formed by a conveyor belt driven in a translational movement along the longitudinal direction in relation to the extrusion head or by a roller which is driven in rotation in relation to the extrusion head, about its central axis which is parallel to the lateral direction.

* * * * *